United States Patent
Khanduja et al.

(10) Patent No.: US 10,250,723 B2
(45) Date of Patent: Apr. 2, 2019

(54) PROTOCOL-LEVEL IDENTITY MAPPING

(71) Applicant: BlueTalon, Inc., Redwood City, CA (US)

(72) Inventors: Rakesh Khanduja, Bangalore (IN); Vineet Mittal, Bangalore (IN)

(73) Assignee: BlueTalon, Inc., Redwood City, CA (US)

( * ) Notice: Subject to any disclaimer, the term of this patent is extended or adjusted under 35 U.S.C. 154(b) by 0 days.

(21) Appl. No.: 15/487,360

(22) Filed: Apr. 13, 2017

(65) Prior Publication Data

US 2018/0302399 A1     Oct. 18, 2018

(51) Int. Cl.
*H04L 29/06* (2006.01)
*H04L 29/08* (2006.01)

(52) U.S. Cl.
CPC .......... *H04L 69/26* (2013.01); *H04L 63/0884* (2013.01); *H04L 67/10* (2013.01); *H04L 69/08* (2013.01); *H04L 63/083* (2013.01)

(58) Field of Classification Search
USPC .......................................................... 726/3
See application file for complete search history.

(56) References Cited

U.S. PATENT DOCUMENTS

| | | |
|---|---|---|
| 5,537,548 A | 7/1996 | Fin |
| 5,604,490 A * | 2/1997 | Blakley, III ............ G06F 21/41 340/5.74 |
| 6,226,372 B1 | 5/2001 | Beebe |
| 6,463,470 B1 | 10/2002 | Mohaban |
| 6,687,229 B1 | 2/2004 | Kataria |
| 6,993,596 B2 * | 1/2006 | Hinton ................... G06F 21/41 709/204 |
| 7,542,943 B2 | 6/2009 | Caplan |
| 7,631,084 B2 | 12/2009 | Thomas |
| 7,730,089 B2 | 6/2010 | Campbell |
| 8,181,221 B2 | 5/2012 | Manickam et al. |
| 8,196,183 B2 | 6/2012 | Smith |

(Continued)

OTHER PUBLICATIONS

PCT International Search Report in International Application No. PCT/OS2018/027373, dated Jul. 4, 2018, 3 pages.

(Continued)

*Primary Examiner* — Kambiz Zand
*Assistant Examiner* — Aubrey H Wyszynski
(74) *Attorney, Agent, or Firm* — Fish & Richardson P.C.

(57) ABSTRACT

Systems, computer program products and methods implementing protocol-level mapping are described. An identity mapping system intercepts a request from a client device to a distributed computing system. The identity mapping system determines a first protocol of the request. The identity mapping system determines user credentials associated with the request. The identity mapping system authenticates the request based on the user credentials. The identity mapping system determines a service provided by the distributed computing system that the request accesses. The identity mapping system determines service credentials of that service. The identity mapping system translates the first protocol into a second protocol associated with the distributed computing system, including associating the service credentials with the request. The identity mapping system then submits the request to the distributed computing system.

20 Claims, 4 Drawing Sheets

(56) References Cited

U.S. PATENT DOCUMENTS

| | | |
|---|---|---|
| 8,613,108 B1 | 12/2013 | Aggarwal |
| 8,677,447 B1 | 3/2014 | Zuk et al. |
| 8,683,560 B1 | 3/2014 | Brooker |
| 9,071,594 B2 | 6/2015 | Boulos et al. |
| 9,614,715 B2 | 4/2017 | Bhave |
| 9,866,592 B2 | 1/2018 | Arumugam et al. |
| 9,871,825 B2 | 1/2018 | Arumugam et al. |
| 2001/0023486 A1 | 9/2001 | Kayashinna |
| 2002/0007404 A1 | 1/2002 | Vange |
| 2002/0019828 A1 | 2/2002 | Mortl |
| 2002/0169907 A1 | 11/2002 | Candea |
| 2003/0018786 A1 | 1/2003 | Lortz |
| 2003/0021283 A1 | 1/2003 | See |
| 2003/0046315 A1 | 3/2003 | Feig |
| 2003/0115322 A1 | 6/2003 | Moriconi |
| 2004/0054791 A1 | 3/2004 | Chakraborty |
| 2004/0073668 A1 | 4/2004 | Bhat |
| 2004/0088560 A1 | 5/2004 | Danks |
| 2004/0128394 A1 | 7/2004 | Knauerhase |
| 2004/0267749 A1 | 12/2004 | Bhat |
| 2005/0021978 A1 | 1/2005 | Bhat |
| 2005/0091212 A1 | 4/2005 | Mohamed et al. |
| 2005/0223217 A1 | 10/2005 | Howard et al. |
| 2006/0053216 A1 | 3/2006 | Deokar |
| 2006/0288228 A1 | 12/2006 | Botz et al. |
| 2007/0124797 A1 | 5/2007 | Gupta |
| 2007/0156659 A1 | 7/2007 | Lim |
| 2007/0174831 A1 | 7/2007 | Lee |
| 2007/0234408 A1 | 10/2007 | Burch |
| 2008/0301437 A1 | 12/2008 | Chevalier |
| 2009/0049512 A1 | 2/2009 | Manickam et al. |
| 2010/0024019 A1 | 1/2010 | Backlund |
| 2010/0064341 A1 | 3/2010 | Aldera |
| 2010/0235396 A1 | 9/2010 | Chaurasia et al. |
| 2010/0281524 A1 | 11/2010 | Ghittino |
| 2011/0209194 A1 | 8/2011 | Kennedy |
| 2011/0314533 A1 | 12/2011 | Austin et al. |
| 2012/0110632 A1 | 5/2012 | Burghart |
| 2012/0131164 A1 | 5/2012 | Bryan |
| 2012/0198467 A1 | 8/2012 | Jackson |
| 2013/0061306 A1 | 3/2013 | Sinn |
| 2013/0117313 A1 | 5/2013 | Miao |
| 2013/0332982 A1 | 12/2013 | Rao et al. |
| 2014/0068699 A1 | 3/2014 | Balacheff |
| 2014/0090085 A1 | 3/2014 | Mattsson et al. |
| 2014/0128053 A1 | 5/2014 | Merchant |
| 2014/0165134 A1 | 6/2014 | Goldschlag |
| 2014/0196115 A1 | 7/2014 | Pelykh |
| 2014/0229596 A1 | 8/2014 | Burke |
| 2014/0351573 A1 | 11/2014 | Martini |
| 2015/0019721 A1 | 1/2015 | Zinin |
| 2015/0113010 A1 | 4/2015 | Muthyala et al. |
| 2015/0128205 A1 | 5/2015 | Mahaffey |
| 2015/0381660 A1 | 12/2015 | Hsiung |
| 2016/0085962 A1 | 3/2016 | Sokolov et al. |
| 2016/0094546 A1* | 3/2016 | Innes ................. H04L 63/0823 713/156 |
| 2016/0119349 A1 | 4/2016 | Wang et al. |
| 2016/0149859 A1 | 5/2016 | Curtis |
| 2016/0205101 A1 | 7/2016 | Verma et al. |
| 2016/0342803 A1 | 11/2016 | Goodridge |
| 2017/0012962 A1 | 1/2017 | Lissack |
| 2017/0093925 A1 | 3/2017 | Sheretov |
| 2017/0208033 A1 | 7/2017 | Roskind |
| 2018/0131726 A1 | 5/2018 | Arumugam et al. |
| 2018/0131727 A1 | 5/2018 | Arumugam et al. |

OTHER PUBLICATIONS

PCT International Search Report in International Application No. PCT/US2018/017698, dated May 21, 2018, 3 pages.

International Application No. PCT/US2016/054107, Notification of Transmittal of the International Search Report and the Written Opinion of the International Searching Authority, dated Jan. 9, 2017, 13 pages.

International Application No. PCT/US2016/065853, Notification of Transmittal of the International Search Report and the Written Opinion of the International Searching Authority, dated Mar. 24, 2017, 14 pages.

* cited by examiner

PROTOCOL-LEVEL IDENTITY MAPPING

BACKGROUND

A distributed computing system can provide various services such as distributed data processing services, distributed file storage services, distributed database services, or distributed messaging services. For example, a distributed computing system based on Apache® Hadoop® technology can include a Hadoop Distributed File System (HDFS) component that provides file storage service, a Hive™ component that provides data warehouse service, and a Spark™ component that provides data processing service. In the system, service-specific system accounts, such as hdfs, hive and spark, sometimes referred to as service accounts, may be used to access data of the respective services. Multiple application programs can use the service accounts to access the data. Multiple end users may use the application programs. The end users may be trusted by the distributed computing system or they may come from non-trusted data sources like enterprises, homes, other clouds, etc.

In conventional technology, mapping the end user accounts to the service account can be achieved in a static manner. For example, a conventional system can achieve the mapping at system level, where the mapping is built into the distributed computing system. A conventional system can achieve the mapping at application level, where the mapping is built into each application program.

SUMMARY

In general, this specification relates to computer system administration techniques.

Systems, computer program products and methods implementing protocol-level mapping are described. An identity mapping system intercepts a request from a client device to a distributed computing system. The identity mapping system determines a first protocol of the request. The identity mapping system determines user credentials associated with the request. The identity mapping system authenticates the request based on the user credentials. The identity mapping system determines a service provided by the distributed computing system that the request accesses. The identity mapping system determines a service account and service credentials of that service. The identity mapping system translates the first protocol into a second protocol associated with the distributed computing system. The translation includes associating the service credentials with the request. The identity mapping system then submits the request to the distributed computing system.

Particular embodiments of the subject matter described in this specification can be implemented to realize one or more of the following example advantages. The disclosed techniques provide simple and effective way of mapping service accounts of a distributed computing system to application end users without changing a configuration of the distributed computing system or changing a configuration of the applications. The disclosed techniques implement the mapping at protocol level, which is outside of application programs. Accordingly, the disclosed techniques improve upon conventional techniques by providing a dynamic and transparent layer between the end users of the application programs and the distributed computing system. The transparency enables this layer to provide a more scalable framework for the applications than conventional techniques can provided, at least because the mapping logic is independent from the applications and is applicable to multiple applications.

The disclosed techniques can enhance security of a distributed computing system by adding user configurable authentication and authorization to the distributed computing system without changing configuration of the distributed computing system. The disclosed techniques can provide multiple levels of different authentication methods, adding flexibility to the system. These authentication methods can correspond to specific needs of individual end users, and are not limited by authentications provided by the distributed computing platform. Accordingly, the disclosed techniques make authentication more flexible and customizable.

The details of one or more embodiments of the subject matter of this specification are set forth in the accompanying drawings and the description below. Other features, aspects and advantages of the subject matter will become apparent from the description, the drawings and the claims.

BRIEF DESCRIPTION OF THE DRAWINGS

Like reference numbers and designations in the various drawings indicate like elements.

DETAILED DESCRIPTION

Figure 1:
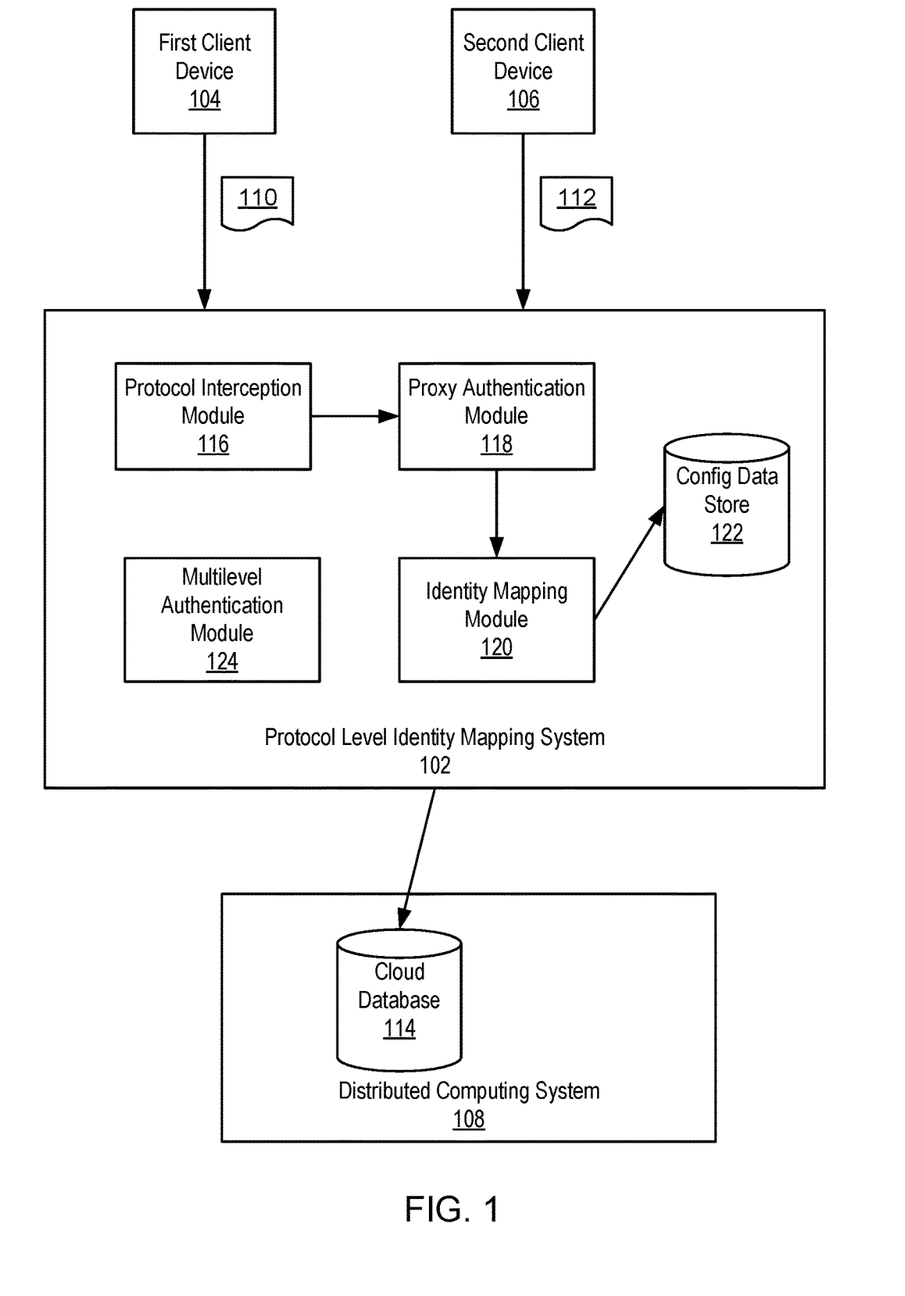
FIG. 1 is a block diagram illustrating example techniques of protocol-level identity mapping.

FIG. 1 is a block diagram illustrating example techniques of protocol-level identity mapping. An identity mapping system 102 performs protocol-level mapping between user identities and service identities. The identity mapping system 102 includes one or more computers.

Client devices 104 and 106 submit requests to an access distributed computing system 108. Each of the client devices 104 and 106 can be a computer associated with a respective enterprise user account using the distributed computing system 108. An account name of the user account can be referred to as a user identity. The client devices 104 and 106 can submit various types of requests, including requests 110 and 112 that require authentication. Each of the requests 110 and 112 is associated with credentials for the authentication, e.g., a user identity Alice and a user identity Bob, respectively. The client device 104 can submit the request 110 in a first user protocol. The client device 106 can submit the request 112 in a second user protocol. The first user protocol may be the same as, or different from, the second user protocol. Each protocol can specify a set of procedures and data formats for communication. The requests 110 and 112 are for invoking one or more services of the distributed computing system 108.

The distributed computing system 108 includes one or more computers programmed to perform various services. For example, the distributed computing system 108 can be a Hadoop system providing a database service 114. The database service 114 can run under ownership of a corresponding operating system account, e.g., a UNIX account. The operating system account is the service account. An account name, e.g., hdfs, of the service account can be referred to as a service identity. The service account for the database service 114, as well as other service accounts, belong to a dedicated operating system user group and are different from user accounts for Alice and Bob associated with requests 110 and 112.

The identity mapping system 102 maps the user identities Alice and Bob to the service accounts hdfs at protocol level. Protocol level is a layer of communication that supports various applications. For example, a protocol level can include one or more layers in the OSI network model standard that are below layer 7, which is the application layer.

The identity mapping system 102 intercepts the requests 110 and 112 at protocol level. The identity mapping system 102 injects a service identity in an authentication protocol between a database server of the distributed computing system 108 and database clients of the database server. In the example shown, the clients are the client devices 104 and 106. The protocol can include, for example, a Java database connectivity (JDBC) protocol, an open database connectivity (ODBC) protocol, or a command-line interface (CLI) protocol.

The identity mapping system 102 can determine that the requests 110 and 112 are authentication requests, which need to be authenticated. The identity mapping system 102 authenticates the requests 110 and 112 using the credentials of users Alice and Bob. The identity mapping system 102 determines respective user protocols under which the requests 110 and 112 are issued. The identity mapping system 102 swaps authentication headers of authenticated user accounts with the service account credentials and establishes a connection under the service account using the service identity.

The identity mapping system 102 includes a protocol interception module 116. The protocol interception module includes hardware and software components configured to intercept, at protocol level, exchanges of packets of byte streams between each of the client devices 104 and 106 and the distributed computing system 108. For example, at a first stage, the protocol interception module 116 can intercept the request 110 from the client device 104 to the distributed computing system 108. The request 110 includes a first byte stream. The first byte stream can include a portion that is a tag that indicates whether the request 110 is an authentication request. In the example below, the tag includes eight bytes, as shown in Listing (1), where each byte is represented as a hexadecimal number.

00 00 00 08 04 d2 16 2f     (1)

The protocol interception module 116 can determine that bytes 04 d2 16 2f in the tag indicate that the request 110 submitted by the client device 104 includes an authentication request. At this first stage, the request 110 may not have been associated with credentials.

Based on the tag, the protocol interception module 116 determines that the client device 104 is requesting authentication from the distributed computing system 108. The protocol interception module 116 passes the authentication request to the distributed computing system 108. At a second stage, the distributed computing system 108 responds with a second byte stream as shown below in Listing (2).

52 00 00 00 08 00 00 00 00     (2)

The protocol interception module 116 intercepts the second byte stream from the distributed computing system 108 to the client device 104. The protocol interception module 116 determines that a flag, e.g., the last byte of the second byte stream, has a value, e.g., 00, that indicates that the distributed computing system 108 uses a trust mode authentication. The trust mode authentication is a mode in which the distributed computing system 108 trusts the request 110 when request 110 is associated with any credentials or no credentials at all.

In a third stage, the protocol interception module 116 enhances security of the communication by adding authentication operations, even when the distributed computing system 108 does not require any. The protocol interception module 116 modifies the second byte stream into a third byte stream. The third byte stream indicates that additional authentication is needed. The third byte stream is shown below in Listing (3).

52 00 00 00 08 00 00 00 03     (3)

In the example shown, the protocol interception module 116 changes the value of the flag to a new value that indicates that the request shall use password authentication. In the example shown, the protocol interception module 116 changes the last byte from 00 to 03. The protocol interception module 116 provides the third byte stream to the client device 104.

In response, in a fourth stage, the client device 104 provides user credentials to the distributed computing system 108. The credentials include a user identifier (e.g., "Alice") and a password (e.g., "zkabiegfq"). The client device 104 provides user credentials in a fourth byte stream. An example of the fourth byte stream including the user credentials is shown below in Listing (4).

00 00 00 29 00 03 00 00 75 73 65 72 00 41 6c
69 . . . ) . . . user.Ali 63 65 00 64 61 74 61 62 61 73 65 00 61 6e 61 75
ce.database.anau 64 69 74 72 65 70 6f 00 00 ditrepo . . .

70 00 00 00 0e 7a 6b 61 62 69 65 67 66 71
00 p . . . zkabiegfq     (4)

In Listing (4), the left portion is the byte stream in hexadecimal representation. The right portion is corresponding hexadecimal numbers in character representation, where a hexadecimal number is translated to a character based on ASCII, for convenience. For example, the user identifier Alice and password zkabiegfq are shown in the right portion of Listing (4).

In a fifth stage, the protocol interception module 116 intercepts the fourth byte stream and identifies the credentials. The protocol interception module 116 decodes the fourth byte stream to determine the user identifier and the password. For example, the protocol interception module 116 can determine that a particular flag, e.g., the first byte in the bottom line of Listing (4), has a particular value, e.g., 70, that indicates that the following bytes includes a password. The protocol interception module 116 can determine that a particular byte, e.g., the fifth byte in the bottom line of Listing (4), has a particular value, e.g., 0e, that indicates a size of the password portion of the fourth byte stream.

In a sixth stage, the protocol interception module 116 provides the user identifier, e.g., Alice and password, e.g., zkabiegfq to a proxy authentication module 118. The proxy authentication module 118 is a component of the identity mapping system 102 including hardware and software components configured to authenticate the user based on the user identifier and password. The proxy authentication module 118 can authenticate the user internally, or use a preconfigured or user specified authentication service. For example, the proxy authentication module 118 can submit the user identifier and password to an LDAP/Active Directory for authentication.

In a seventh stage, in response to successful authentication, the proxy authentication module 118 notifies an identity mapping module 120 of the identity mapping system 102 of the success. The identity mapping module 120 includes hardware and software components configured to retrieve service credentials from a configuration data store 122. The configuration data store 122 can include a database, a configuration file, or both. The service credentials can include a service identifier for the service provided by the distributed computing system 108. For example, the service credentials can include a service identifier (e.g., "anaudituser") of the cloud database service 114. The cloud database service 114 can be provided by a PostgreSQL database.

In an eighth stage, the identity mapping module 120 translates the protocol of the request 110 by modifying the fourth byte stream submitted by the client device 104 into a fifth byte stream. The modification can include replacing the user identifier, e.g., Alice with the service identifier, e.g., anaudituser. For example, the identity mapping module 120 can modify the fourth byte stream as shown in Listing (4) above to the fifth byte stream that reads as follows, as shown in Listing (5).

00 00 00 2f 00 03 00 00 75 73 65 72 00 61 6e 61 .
. . / . . . user.ana 75 64 69 74 75 73 65 72 00 64 61 74 61 62 61 73
udituser.databas 65 00 61 6e 61 75 64 69 74 72 65 70 6f 00 00
e.anauditrepo        (5)

In a ninth stage, the identity mapping module 120 can determine that, since the distributed computing system originally indicated in the second byte stream as shown in Listing (2), that the authentication mode is a trust mode, the identity mapping module 120 does not need to include the password, e.g., zkabiegfq or other passwords in the fifth byte stream shown in Listing (5). The identity mapping module 120 provides the fifth byte stream to the distributed computing system 108. The database service 114 then handles the request.

Throughout the stages of the operations, the identity mapping system 102 hides user credentials from the distributed computing system 108, and hides service credentials from the client devices 104 and 106. Likewise, the identity mapping system 102 hides the authentication operations at the sixth stage from the distributed computing system 108 and the client devices 104 and 106. Accordingly, the operations are transparent to the distributed computing system 108 and the client devices 104 and 106, allowing the systems to be flexible and scalable.

In some implementations, the identification mapping system includes a multi-level authentication module 124. The multi-level authentication module 124 includes hardware and software components configured to perform customized authentication for a request, e.g., the request 112. The customized authentication can include authentication at user defined levels using user defined credentials in addition to user identifier and password.

Figure 2:
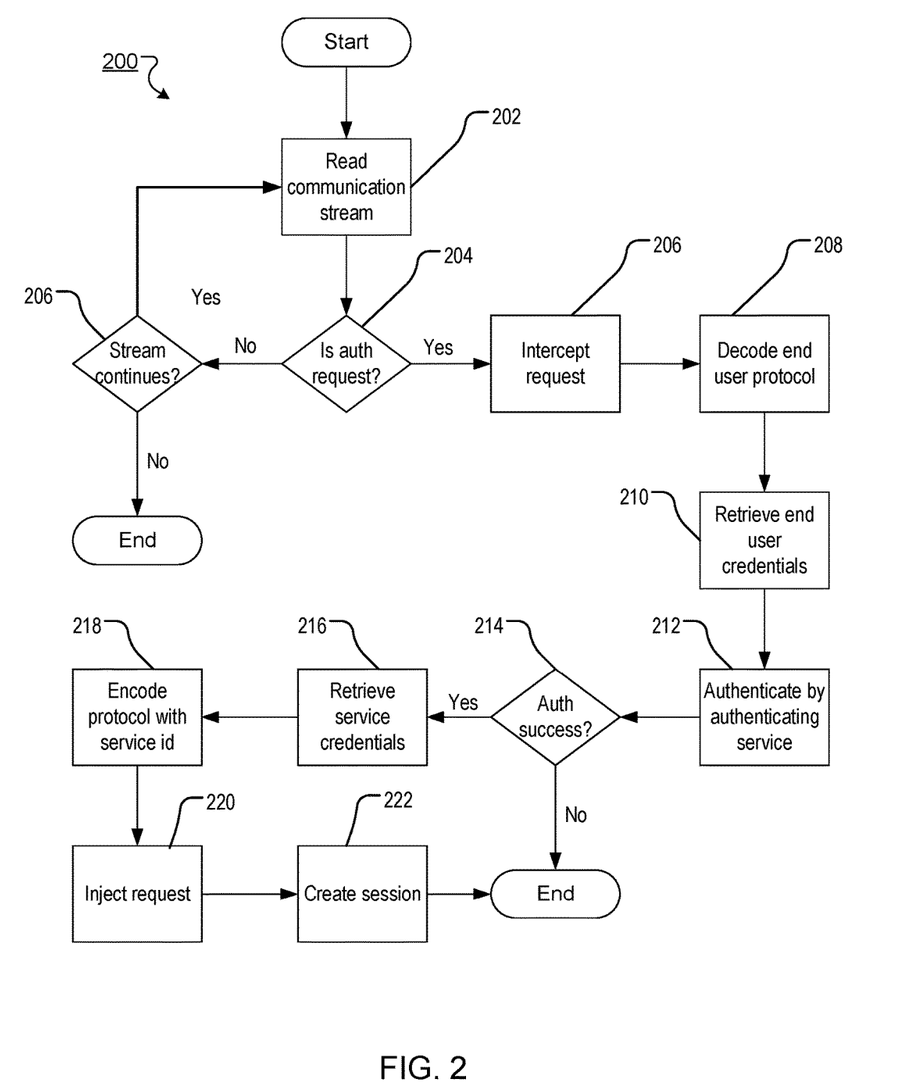
FIG. 2 is a flowchart illustrating an example process of protocol-level identity mapping.

FIG. 2 is a flowchart illustrating an example process 200 of protocol-level identity mapping. The process 200 can be performed by an identity mapping system, e.g., the identity mapping system 102 of FIG. 1. The process 200 can be triggered by communication between a client device and a distributed computing system.

The identity mapping system reads (202) a communication stream. The communication stream can be a byte stream that passes between a client device, e.g., a client computer at an enterprise, and a distributed computing system, e.g., a computing platform based on Apache Hadoop architecture.

The identity mapping system determines (204) whether the communication stream includes an authentication request. The identity mapping system can make the determination by inspecting the communication stream and determine if a portion of the communication stream, e.g., a header, includes any indicator, e.g., certain values at certain locations, indicating that the communication stream includes an authentication request. An authentication request is a request that needs to be authenticated.

In response to determining that the communication stream does not include an authentication request, the identity mapping system determines (206) whether the client stream continues. If the client stream continues, the identity mapping system passes the communication stream to the distributed computing system and continues reading (202) the communication stream. Otherwise, the identity mapping system ends the process 200.

In response to determining that the communication stream includes an authentication request, the identity mapping system intercepts (206) the request by at least temporarily withholding the request from the distributing system until further processing is done. The identity mapping system decodes (208) an end user protocol from the intercepted request. Decoding the end user protocol can include identifying a flag in the request that indicates a protocol type, and then performing a lookup in a protocol database using a location of the flag in the request, a value of the flag, or both.

The identity mapping system retrieves (210) user credentials. Retrieving the user credentials can include submitting at least a portion of the communication stream, unaltered, to the distributed computing system and modifying a response from the distributed computing system indicating that no credentials are required. The modified response can indicate that the user credentials are required. The identity mapping system can provide the modified response to the client device. The modified response can trigger the client device to provide the user credentials in a next byte stream. The identity mapping system then receives the next byte stream, and retrieves the user credentials from the next byte stream. In some implementations, the identity mapping system can determine a user identifier and a password from the user credentials. In some implementations, the identity mapping system can determine an authentication token from the user credentials.

The identity mapping system authenticates (212) the request. The identity mapping system can authenticate the request by authenticating the user identifier using an external authentication service. The identity mapping system can provide the user identifier and password to the external authentication service, and receive a response from the external authentication service.

The identity mapping system determines (214) if the authentication is successful based on the response. In response to determining that the response indicates that the authentication fails, the identity mapping system can terminate the process 200. In response to determining that the response indicates that the authentication succeeds, the identity mapping system retrieves (216) service credentials. The service credentials can include a service identifier (e.g., a service account name) and, optionally, a service password. The service credentials can include a token for authentication. The identity mapping system can retrieve the service credentials from a service data store, e.g., a database or a configuration file.

The identity mapping system can encode (218) the byte stream in a protocol used by the distributed computing system. The encoding can include embedding a representation of the service identifier into the byte stream. The encoding translates the request into a format that is understood by a protocol of the service of the distributed computing system. The identity mapping system injects (220) the request, in the translated format, into the distributed computing system. The identity mapping system creates (222) a session, e.g., a database session, on the distributed computing system. The session then performs operations of serving the request, e.g., by retrieving or inserting data.

Figure 3:
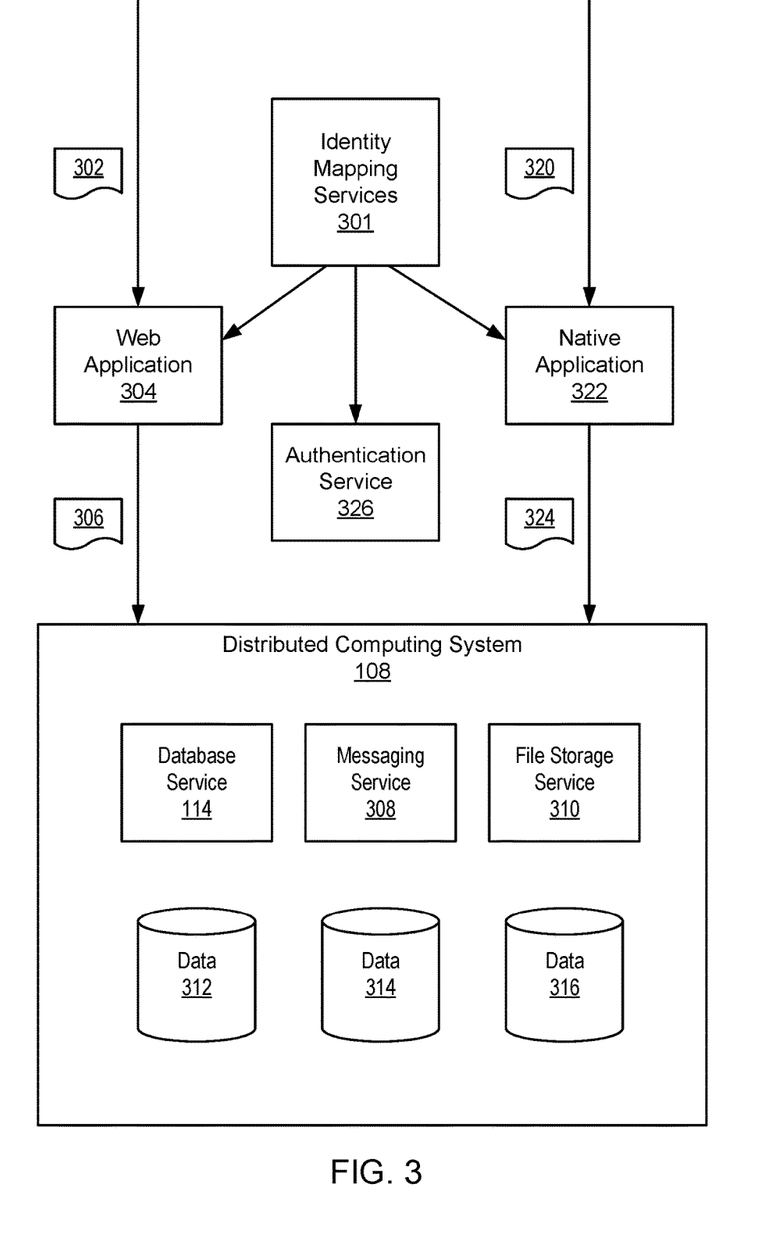
FIG. 3 is a block diagram illustrating an architecture of protocol-level identity mapping for various applications.

FIG. 3 is a block diagram illustrating an architecture of protocol-level identity mapping for various applications. An identity mapping system, e.g., the identity mapping system 102 of FIG. 1, performs identity mapping operations at protocol level. Accordingly, the mapping can be transparent to the applications and users.

The identity mapping system can provide identity mapping services 301 that include the operations described in reference to FIG. 2. A client device submits a first request to a distributed computing system 108. The first request can include, or be associated with, a first user identity 302. The first request can access a web application 304 that is backed by the distributed computing system 108. The distributed computing system 108 can provide various services, including, for example, database service 114, messaging service 308, and file storage service 310. Various data 312, 314 and 316 are accessed through these services. Each of the database service 114, messaging service 308, and file storage service 310 executes in a respective service account having a respective service identity.

The web application 304 serving the request may need to authenticate the user identity 302, and use one or more service identities 306 to access one or more of the database service 114, messaging service 308, and file storage service 310. Without the identity mapping services 301, the web application 304 may need duplicated governance and security, for both the user identity and the service identity. The request may access more than one web applications, in addition to web application 304. Like the web application 304, each of the other web applications may need the duplicated governance and security as well.

Similar to the web application scenario, a native application approach can require duplicated governance and security as well. For example, a client device may submit a second request to access the distributed computing system 108. The second request can include, or be associated with a second user identity 320. A native application 322 receives the second user request, and accesses the one or more of the database service 114, massaging service 308, and file storage service 310 using one or more service identities 324. The native application 322 can be an application developed for a specific operation for a specific user, e.g., a company-specific accounting or inventory tracking program. The native application 322 may need duplicated governance of the user identity 320 and the service identities 324. Different native applications may need to implement different governance and security measures.

The identity mapping services 301, working at protocol level, can handle the governance and security without requiring each web application or native application to implement duplicated and application-specific governance and security. The identity mapping services 301 provide authentication and authorization of user identities, e.g., enterprise/business identities, without changing the web or native applications. The identity mapping services 301 performs introspection on packets passing between the client device and the applications, between the applications and the distributed computing system 108, or both. The identity mapping services 301 detects presence of the user identities 302 and 320 from the packets. The identity mapping services 301 can authenticate the user identities 302 and 320 to an authentication service 326, e.g., an enterprise authentication source. The identity mapping services 301 can further be configured to issue a token, e.g., a Kerberos token, that can respect the authentication as respected by the distributed computing system 108.

In addition, the identity mapping services 301 can change levels of authentication and introduce new authentication methods at the protocol level without changing configuration of the distributed computing system 108. For example, the identity mapping services 301 can change security enforcement flows by adding more levels of authentication without changing database configuration for cloud databases and Hadoop databases.

The identity mapping services 301 can provide transparent mapping of the user identities 302 and 320, e.g., business or enterprise identity, at protocol level for various technologies and platforms, e.g., Hadoop, and cloud database services, e.g., Redshift™ PostgreSQL on RDS™, among others. The identity mapping services 301 can improve security and scalability of the distributed computing system 108 by avoiding creating and maintaining business or enterprise identity on the distributed computing system 108.

Figure 4:
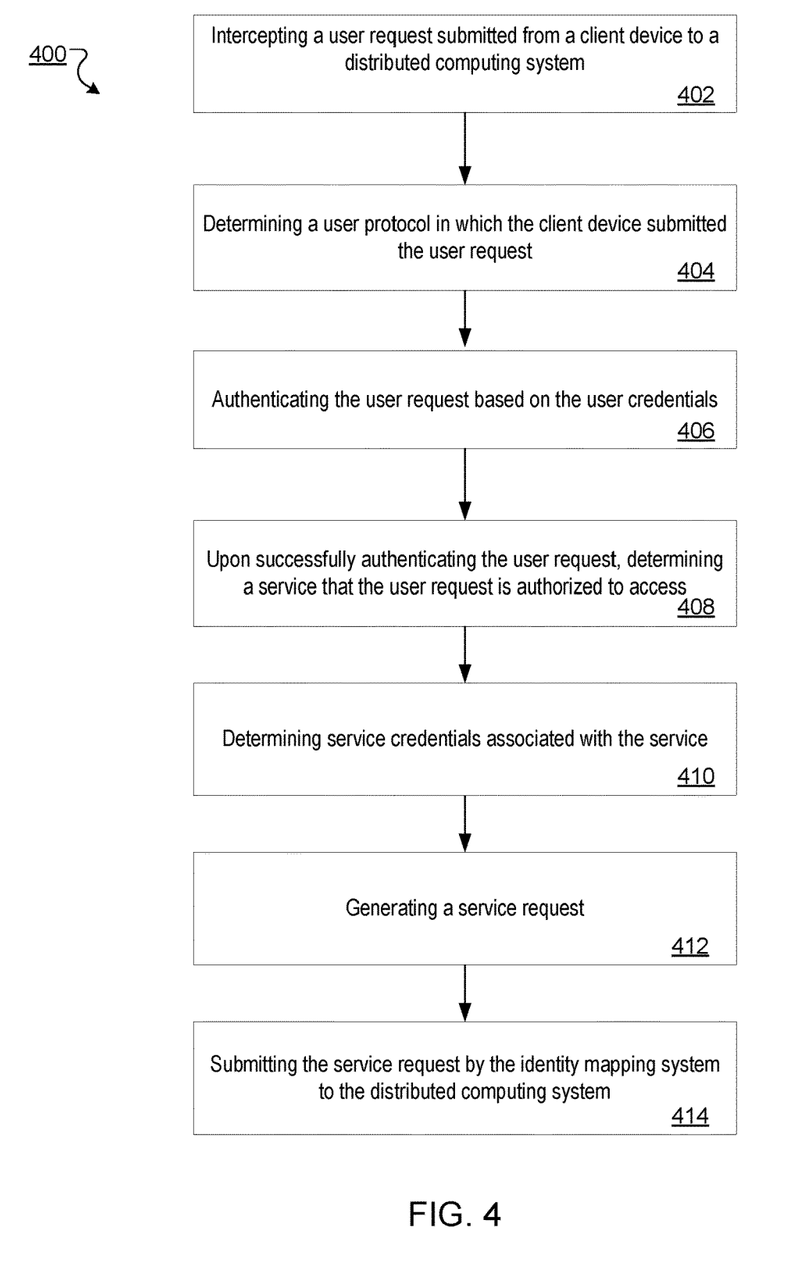
FIG. 4 is a flowchart of an example process of protocol-level identity mapping.

FIG. 4 is a flowchart of an example process 400 of protocol-level identity mapping. The process 400 can be performed by an identity mapping system including one or more computer processors, e.g., the identity mapping system 102 of FIG. 1. The process 400 is performed at protocol level independent of native authentications performed by the client device and native authentications performed by the distributed computing system.

The identity mapping system intercepts (402) a user request submitted from a client device to a distributed computing system that provides a plurality of services. The user request is associated with user credentials. The distributed computing system can include a Hadoop cluster. The services can include at least one of a distributed computing service (e.g., a service based on Spark), a distributed file storage service (e.g., a service based on HDFS), a distributed data warehouse service (e.g., a service based on Hive), or a distributed messaging service (e.g., a service based on Kafka).

The identity mapping system determines (404) a user protocol in which the client device submitted the user request. Determining the user protocol can include identifying one or more tags in a byte stream of the user request and performing a lookup for the user protocol based on the one or more tags.

The identity mapping system authenticates (406) the user request based on the user credentials. Authenticating the user request can include submitting a representation of the user credentials by the identity mapping system to a user authentication service and receiving a response indicating that the user request is authenticated by the user authentication service.

In response to successful authentication of the user request, the identity mapping system determines (408) a service of the services that the user request is authorized to access. Determining the service can include identifying a service that is associated with a user identifier in the user credentials, identifying a service that is associated with the user protocol, or identifying the service based on one or more indicators in the user request.

The identity mapping system determines (410) service credentials associated with the service. The identity mapping system can determine the service credentials from a service credentials data store that includes a database or a configuration file.

The identity mapping system generates (412) a service request. Generating the service request includes translating the user protocol of the user request to a service protocol associated with the service at least in part by associating the service credentials with the service request. Translating the user protocol can include replacing a user identifier of the request with a service identifier. The identity mapping system submits (414) the service request to the distributed computing system.

In some implementations, prior to intercepting the user request, the identity mapping system performs the following operations. The identity mapping system receives a first byte stream from the client device. The identity mapping system determines that that the first byte stream includes an authentication request. The identity mapping system submits the first byte stream to the distributed computing system. The identity mapping system receives, from the distributed computing system, a second byte stream including a tag indicating that the authentication request will be handled in a trust mode where the user credentials are not required for authentication. The identity mapping system modifies the second byte stream, including changing the tag to indicate that the user credentials are required. The identity mapping system transmits the modified byte stream to the client device. The user credentials are provided by the client device in response to the modified byte stream, as triggered by the modified tag.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) monitor, an LCD (liquid crystal display) monitor, or an OLED display, for displaying information to the user, as well as input devices for providing input to the computer, e.g., a keyboard, a mouse, or a presence sensitive display or other surface. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method, comprising:
   intercepting, by an identity mapping system, a user request submitted from a client device through an application program to a distributed computing system that provides a plurality of services, the user request being associated with user credentials, wherein the identity mapping system intercepts the user request at a protocol level that is outside of the application program;
   determining, by the identity mapping system, a user protocol in which the client device submitted the user request;
   authenticating the user request based on the user credentials;
   upon successfully authenticating the user request, determining, by the identity mapping system, a service of the services that the user request is authorized to access;
   determining service credentials associated with the service;
   generating a service request by the identity mapping system, including translating the user protocol of the user request to a service protocol associated with the service at least in part by associating the service credentials with the service request; and
   submitting the service request by the identity mapping system to the distributed computing system, wherein the identity mapping system includes one or more computer processors.

2. The method of claim 1, wherein the distributed computing system includes a Hadoop cluster, and the services include at least one of a distributed computing service, a distributed file storage service, a distributed data warehouse service, or a distributed messaging service.

3. The method of claim 1, wherein authenticating the user request comprises submitting a representation of the user credentials by the identity mapping system to a user authentication service and receiving a response indicating that the user request is authenticated by the user authentication service.

4. The method of claim 1, wherein authenticating the user request comprises performing a multi-level authentication that is customizable, the multi-level authentication being independent from authentication provided by the distributed computing system.

5. The method of claim 1, wherein translating the user protocol comprises replacing a user identifier of the user request with a service identifier.

6. The method of claim 1, comprising, prior to intercepting the user request:
  receiving a first byte stream from the client device;
  determining that the first byte stream includes an authentication request;
  submitting the first byte stream to the distributed computing system;
  receiving, from the distributed computing system, a second byte stream including a tag indicating that the authentication request will be handled in a trust mode where the user credentials are not required for authentication;
  modifying the second byte stream, including changing the tag to indicate that the user credentials are required; and
  submitting the modified byte stream to the client device, wherein the user credentials are provided by the client device in response to the modified byte stream.

7. The method of claim 1, wherein the method is performed at protocol level independent of native authentications performed by the client device and native authentications performed by the distributed computing system.

8. A non-transitory computer readable storage medium storing instructions executable by an identity mapping system and upon such execution cause the identity mapping system to perform operations comprising:
  intercepting a user request submitted from a client device through an application program to a distributed computing system that provides a plurality of services, the user request being associated with user credentials, wherein the user request is being intercepted at a protocol level that is outside of the application program;
  determining a user protocol in which the client device submitted the user request;
  authenticating the user request based on the user credentials;
  upon successfully authenticating the user request, determining a service of the services that the user request is authorized to access;
  determining service credentials associated with the service;
  generating a service request, including translating the user protocol of the user request to a service protocol associated with the service at least in part by associating the service credentials with the service request; and
  submitting the service request by to the distributed computing system, wherein the identity mapping system includes one or more computer processors.

9. The non-transitory computer readable storage medium of claim 8, wherein the distributed computing system includes a Hadoop cluster, and the services include at least one of a distributed computing service, a distributed file storage service, a distributed data warehouse service, or a distributed messaging service.

10. The non-transitory computer readable storage medium of claim 8, wherein authenticating the user request comprises submitting a representation of the user credentials by the identity mapping system to a user authentication service and receiving a response indicating that the user request is authenticated by the user authentication service.

11. The non-transitory computer readable storage medium of claim 8, wherein authenticating the user request comprises performing a multi-level authentication that is customizable, the multi-level authentication being independent from authentication provided by the distributed computing system.

12. The non-transitory computer readable storage medium of claim 8, wherein translating the user protocol comprises replacing a user identifier of the user request with a service identifier.

13. The non-transitory computer readable storage medium of claim 8, the operations comprising, prior to intercepting the user request:
  receiving a first byte stream from the client device;
  determining that the first byte stream includes an authentication request;
  submitting the first byte stream to the distributed computing system;
  receiving, from the distributed computing system, a second byte stream including a tag indicating that the authentication request will be handled in a trust mode where the user credentials are not required for authentication;
  modifying the second byte stream, including changing the tag to indicate that the user credentials are required; and
  submitting the modified byte stream to the client device, wherein the user credentials are provided by the client device in response to the modified byte stream.

14. The non-transitory computer readable storage medium of claim 8, wherein the operations are performed at protocol level independent of native authentications performed by the client device and native authentications performed by the distributed computing system.

15. An identity mapping system comprising:
  one or more computers; and
  one or more storage devices on which are stored instructions that are operable, when executed by the one or more computers, to cause the one or more computers to perform operations comprising:
    intercepting a user request submitted from a client device through an application program to a distributed computing system that provides a plurality of services, the user request being associated with user credentials, wherein the user request is being intercepted at a protocol level that is outside of the application program;
    determining a user protocol in which the client device submitted the user request;
    authenticating the user request based on the user credentials;
    upon successfully authenticating the user request, determining a service of the services that the user request is authorized to access;
    determining service credentials associated with the service;
    generating a service request, including translating the user protocol of the user request to a service protocol associated with the service at least in part by associating the service credentials with the service request; and
    submitting the service request to the distributed computing system.

16. The identity mapping system of claim 15, wherein the distributed computing system includes a Hadoop cluster, and the services include at least one of a distributed computing service, a distributed file storage service, a distributed data warehouse service, or a distributed messaging service.

17. The identity mapping system of claim 15, wherein authenticating the user request comprises submitting a representation of the user credentials by the identity mapping system to a user authentication service and receiving a response indicating that the user request is authenticated by the user authentication service.

18. The identity mapping system of claim 15, wherein authenticating the user request comprises performing a multi-level authentication that is customizable, the multi-level authentication being independent from authentication provided by the distributed computing system.

19. The identity mapping system of claim 15, wherein translating the user protocol comprises replacing a user identifier of the user request with a service identifier.

20. The identity mapping system of claim 15, the operations comprising, prior to intercepting the user request:
- receiving a first byte stream from the client device;
- determining that the first byte stream includes an authentication request;
- submitting the first byte stream to the distributed computing system;
- receiving, from the distributed computing system, a second byte stream including a tag indicating that the authentication request will be handled in a trust mode where the user credentials are not required for authentication;
- modifying the second byte stream, including changing the tag to indicate that the user credentials are required; and
- submitting the modified byte stream to the client device, wherein the user credentials are provided by the client device in response to the modified byte stream.

* * * * *